United States Patent [19]

Bagozzi

[11] 3,888,480

[45] June 10, 1975

[54] APPARATUS FOR LOADING A MAGNETIC TAPE INTO A CASSETTE

[76] Inventor: Ottaviano Clerici Bagozzi, Via Colautti, 1, Milan, Italy, 20125

[22] Filed: Dec. 13, 1973

[21] Appl. No.: 424,597

Related U.S. Application Data

[63] Continuation-in-part of Ser. No. 223,277, Feb. 3, 1972, abandoned.

[30] Foreign Application Priority Data

Feb. 9, 1971 Italy ................................ 20319/71

[52] U.S. Cl. ............. 242/56 R; 156/506; 242/58.4

[51] Int. Cl. ............................................ B65h 19/20

[58] Field of Search ....... 242/56 R, 58.1, 58.2, 58.3, 242/58.4, 58.5, 183; 156/502, 506

[56] References Cited

UNITED STATES PATENTS

| | | | |
|---|---|---|---|
| 2,940,507 | 6/1960 | Buffer | 242/58.4 X |
| 3,637,153 | 1/1972 | King | 242/56 R |
| 3,737,358 | 6/1973 | King | 242/58.4 |
| 3,753,834 | 8/1973 | King | 242/58.4 |
| 3,787,270 | 1/1974 | King | 242/56 R |
| 3,797,770 | 3/1974 | Hosoda | 242/56 R |

FOREIGN PATENTS OR APPLICATIONS

| | | | |
|---|---|---|---|
| 833,549 | 4/1960 | United Kingdom | 242/183 |

*Primary Examiner*—Edward J. McCarthy
*Attorney, Agent, or Firm*—Guido Modiano; Albert Josif

[57] ABSTRACT

An apparatus for automatically cutting, splicing and winding a magnetic tape into a cassette including a tape supply spool, a support for positioning the cassette opposite and proximate to an opening of a work chamber into which the leader of the cassette is sucked and cut and one end of the leader is spliced to one end of the magnetic tape by means of a punch entering the chamber and cutting off a strip of a splicing tape. The apparatus further comprises means for maintaining constant the drawing speed and the tension of the tape during winding and a control for automatically controlling the operation of the apparatus.

9 Claims, 12 Drawing Figures

APPARATUS FOR LOADING A MAGNETIC TAPE INTO A CASSETTE

CROSS-REFERENCES TO RELATED APPLICATIONS

This is a continuation-in-part of application Ser. No. 223,277 filed on Feb. 3, 1972, now abandoned.

BACKGROUND OF THE INVENTION

The present invention relates to an apparatus for the automatic cutting, splicing and winding of a magnetic tape into a cassette.

As is known, empty cassettes for magnetic tapes are furnished with a piece of continuous tape already attached to the relative winding and unwinding spools of the cassette and that the magnetic tape itself, prerecorded or not, is inserted subsequently into the cassette. For this purpose, the continuous tail or leader of the tape already present in the cassette must be cut, and to its free ends are spliced respectively the first portion of the magnetic tape and, after complete winding of same, the end of the magnetic tape.

At the present time most of the operations of placing the cassette in proper position for loading, withdrawing the tape leader already contained in the cassette, and splicing the magnetic tape to the leader are performed manually. The winding of the tape is performed by a motor, with speeds that are limited however, especially because of the delicateness of the tape itself which cannot stand too much traction or jerks which in turn would alter its characteristics. In fact a tape which has undergone an irregular or too hard traction tends to shrink irregularly once it has been wound and to jam the cassette.

It is evident that manual operation is slow and limits production, whereas winding by motor, with constant rotational speed, subjects the tape to a traction and winding speed that are gradually variable during the winding operation itself.

Furthermore, the beginning of the winding of the magnetic tape and the stopping of same give rise to sensible stresses in the tape even if, as stated, the winding speed is rather slow, for example 1–2 m/sec.

SUMMARY OF THE INVENTION

An object of the present invention is to provide an apparatus for the automatic loading of a magnetic tape in a cassette which performs all the operations above described, that is to say, the positioning of the cassette, the extraction of the tape leader already contained within the cassette, the cutting of that leader, the splicing of the magnetic tape between the free ends of the leader, the winding of the magnetic tape, and the removal of the cassette upon completion of the operation, in a completely automatic manner, safeguarding in particular the tape itself from any traction or brusque jerking during the operation.

Another object of the invention is to provide an apparatus of the type described which permits winding the tape at a constant-tension speed during the entire winding and in which the tape is subjected constantly to the same traction, without undergoing jerks of traction, which traction is reduced to extremely low values, on the order of 5 g., even during stops and starts.

Another object of the invention is to provide an apparatus that operates rapidly and with a high hourly production of complete cassettes as compared to the presently known devices.

According to the invention there is provided an apparatus for cutting, splicing and winding a magnetic tape into a cassette, comprising a support for positioning the cassette, means for extracting the leader of the tape already contained within the cassette through an opening of the cassette, positioning means for the leader and the magnetic tape including pivotable members having suction holes for holding the leader and the magnetic tape, means for cutting the leader and the magnetic tape held by said pivotable members, means for splicing a free end of the leader respectively to a free end of the magnetic tape, after cutting, means for advancing and winding the magnetic tape into said cassette after splicing, means for controlling the winding speed and tension of the magnetic tape and means for removing said cassette, from said positioning support, wherein, according to the improvement, said means for extracting the leader of the tape already contained within the cassette comprise a chamber having a height substantially equal to the height of the magnetic tape and of the leader and a contour of length substantially equal to the length of the leader, an opening in said chamber opposite and proximate to said opening of the cassette positioned on said support, the height of said opening being substantially equal to the height of the tape leader, at least one hole in said chamber, and means for creating a vacuum within said chamber through said hole for the extraction of the leader from said cassette, and wherein said positioning means including said pivotable members are arranged within said chamber and further include a portion of said contour of said chamber having suction holes for cooperation with said pivotable members during cutting and splicing of the leader and the magnetic tape.

BRIEF DESCRIPTION OF THE DRAWINGS

Further characteristics and advantages of the invention will become apparent from the following description of a preferred embodiment of the loading apparatus according to the invention, given by way of not limiting example with reference to the accompanying drawings in which.

Figure 9A:
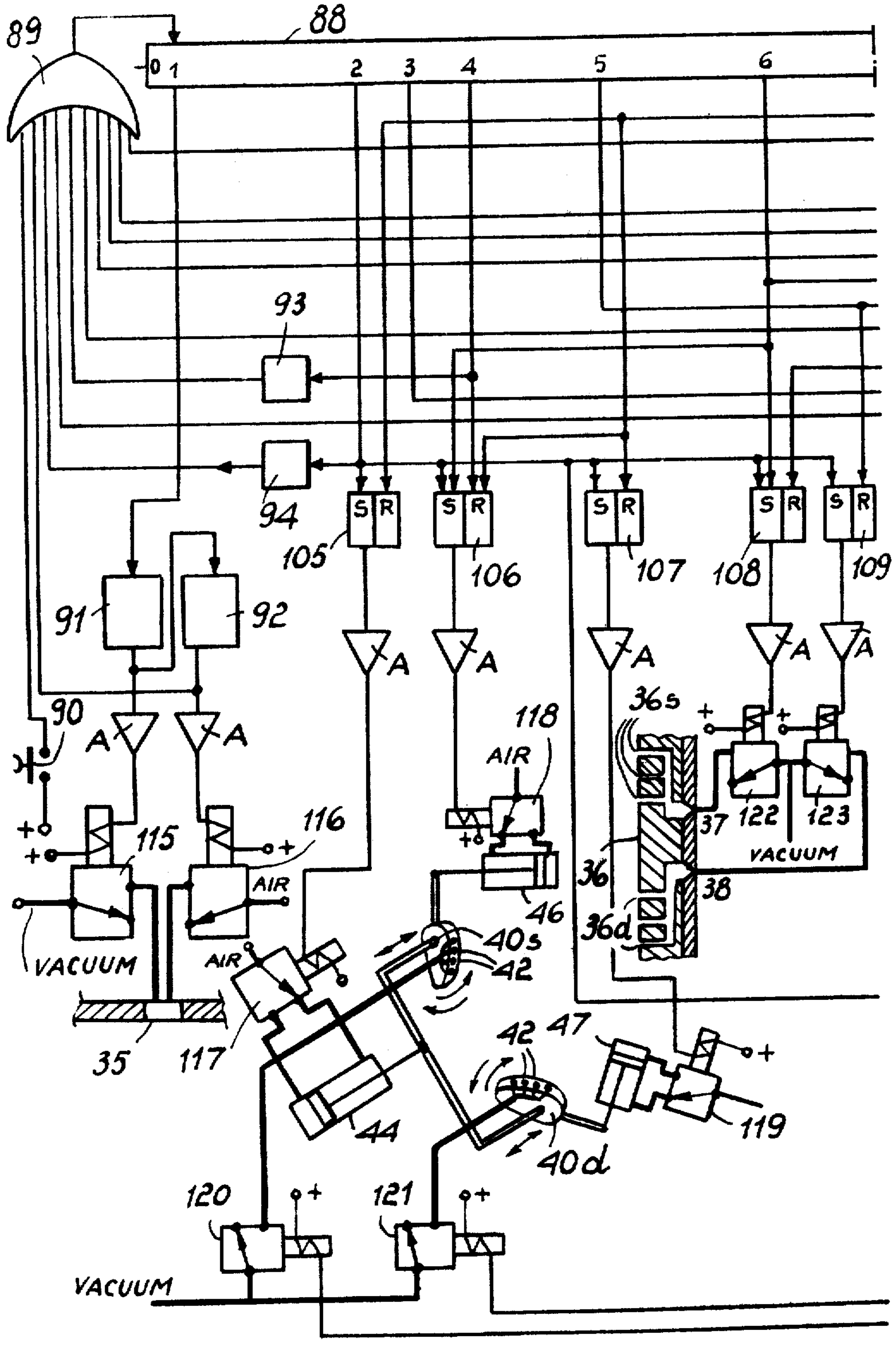
Figure 9B:
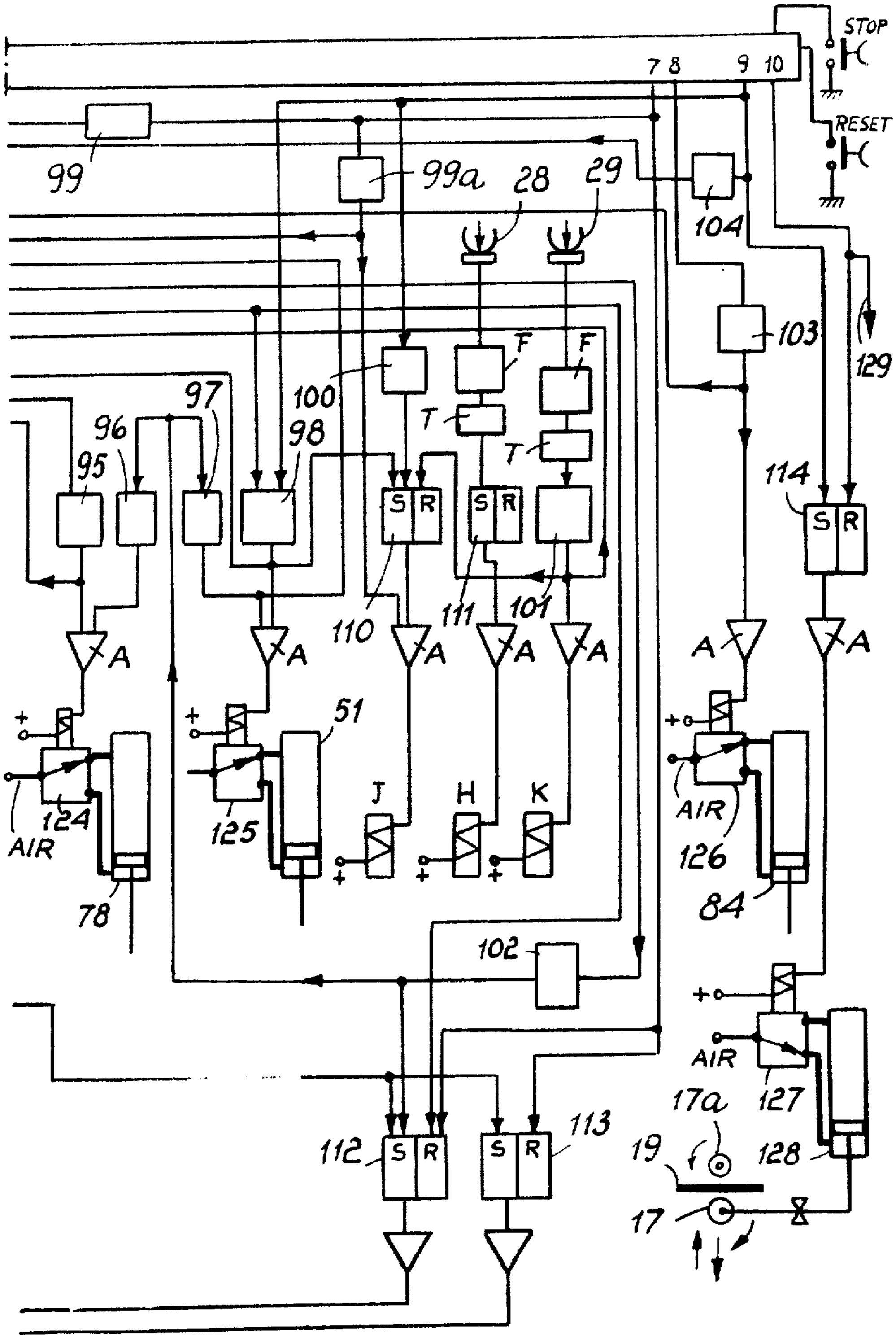

FIGS. **9*a* and 9*b* show a schematic diagram of the control system of the apparatus, whereby FIG. 9*a*** shows the left part of this control system and FIG. 9*b* the right part thereof.

DESCRIPTION OF THE PREFERRED EMBODIMENT

Figure 1:
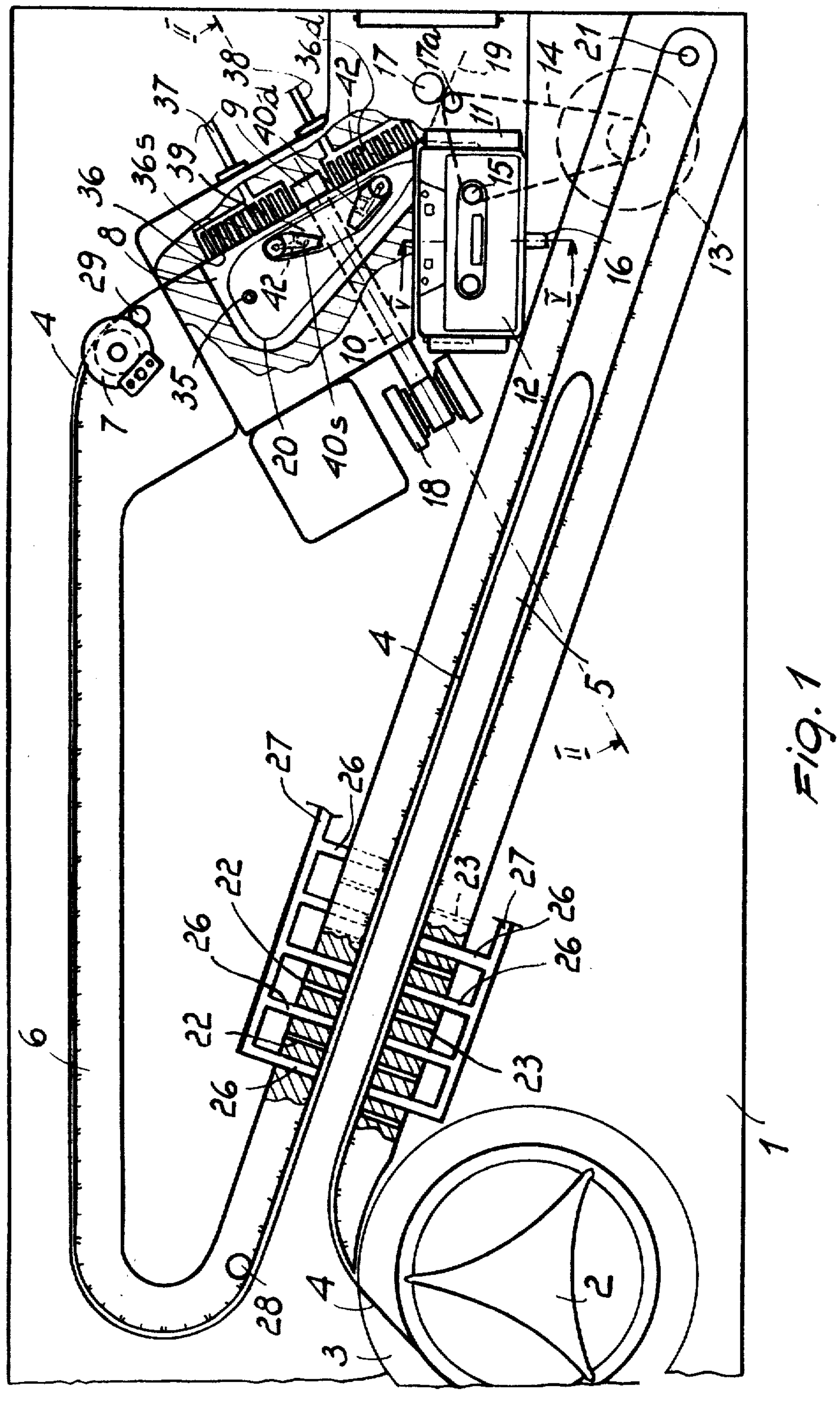
FIG. 1 is a plan view of the apparatus according to this invention.

Referring to FIG. 1, the apparatus according to the invention essentially comprises a support plate 1, on which the various operative components of the apparatus are arranged, a tape supply spool 2, driven by a servomotor 3, a vacuum-operated chamber 5, in which the tape forms a loop, a guide 6 for the tape located downstream of the vacuum-operated chamber 5 and provided with means 7 for sensing the speed of the tape, a work chamber 8, in which are performed the operations of cutting and splicing the ends of the tape with the ends of the leader 20 which has been cut, by means of a cutting mechanism 9 and a splicing mechanism 10, a support 11 for positioning the cassette 12 as well as a tapewinding electric motor 13, which acts through means of a belt 14 or the like on the winding hub 15 contained within the cassette 12. The apparatus further includes means 16 for removing the cassette at the end of the operation, a roller 17 for removing the segments of magnetic tape 19 not recorded if any, and a supply reel 18 of adhesive or splicing tape with which the splicing of the tapes is performed in work chamber 8.

The means hereabove briefly described will now be considered in detail.

The vacuum-operated chamber 5, provided between the tape supply spool 2 and the splicing and winding chamber 8, has a somewhat elongated form, a height about equal to that of the magnetic tape, and a width sufficient to permit the loop of the tape adequate freedom of movement. At the closed end of the vacuum chamber opposite to that of the entrance of the tape there is provided a hole 21, by means of which vacuum is produced in chamber 5, such hole being connected to a source of vacuum of standard type, particularly having a large capacity and low operating cost.

The vacuum produced within chamber 5 causes the tape 4 to enter in greater or lesser extent into chamber 5 according to the traction exerted on the tape 4 during winding thereof. Every variation in the rotational speed of hub 15 with respect to that of servomotor 3, is offset by the suction effect produced by hole 21 and is not directly sensed by the tape but only results in varying the turn-around position of the tape in the vacuum chamber, so that the tape is practically subjected only to low and constant traction.

Figures 1A, 6A, 8:
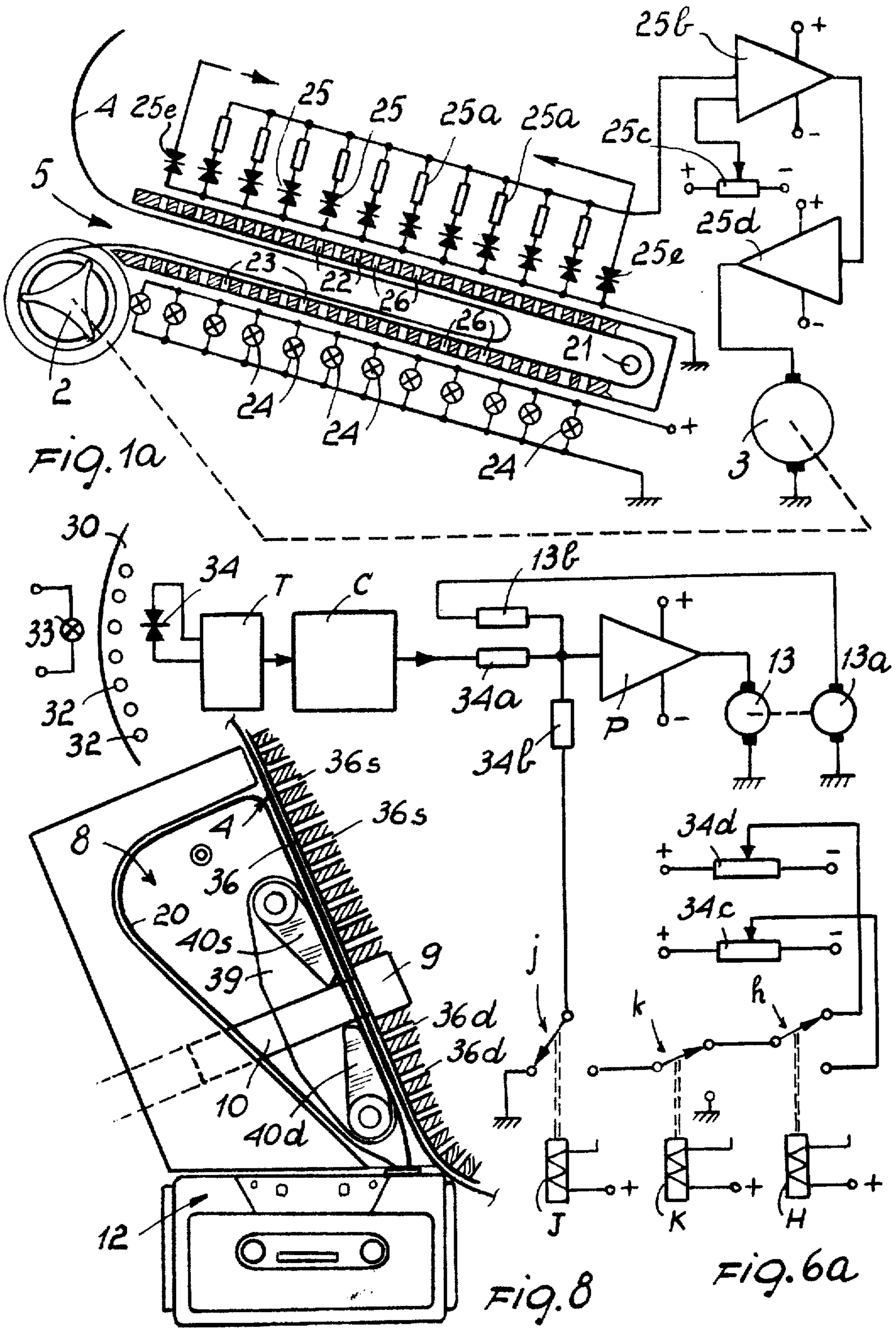
**FIG. 1*a*** is a schematic diagram of the circuit for controlling the servomotor of the tape supply spool.
**FIG. 6*a*** shows the circuit for controlling the motor for winding the tape into the cassette.
FIG. 8 shows the chamber in which cutting and splicing takes place in an enlarged scale with respect to FIG. 1.

The variation in the position of the turned end of the loop is sensed by sensing elements located in holes 22, 23 machined in the side walls of chamber 5 and facing the tape. Said sensing elements, for example light-emitting sources in holes 23 and photosensitive elements such as photoresistors or photodiodes in holes 22, control the servomotor 3 in the sense of giving it a greater or lesser speed of unwinding of the tape, or stopping it, or causing it to start again. The circuit for this control is shown in FIG. 1*a* and comprises a plurality of lamps 24 as light emitting sources connected in parallel to each other and each associated to a corresponding hole 23 and a plurality of photodiodes 25 connected in parallel to each other and each associated to a corresponding hole 22 aligned with a hole 23. The photodiodes 25 are each connected through a resistor 25*a* to the input of a differential amplifier 25*b*, which has its second input connected to an adjustable resistor 25*c* providing a reference input voltage. Lamps 24 are all lighted when the apparatus is in operative condition. The operational amplifier 25*b* is connected to a power amplifier 25*d* controlling the supply voltage to electric motor 3. When a too rapid or too slow unwinding of the spool 2 with respect to the winding of the tape performed by winding motor 13 and hub 15 occurs, the tape loop 4 in chamber 5 lengthens or becomes shorter and a different number of photodiodes 25 is darkened by the loop and consequently the resistance of the circuit including photodiodes is varied and a difference in the input voltage of amplifier 25*b* with respect to the reference voltage occurs causing the amplifier to transmit a control signal to the power amplifier 25*d* for slowing down or increasing the speed of motor 3 and therefore slowing down or increase the unwinding speed. It is clear that such regulation is very sensible in view of the great number of sensing elements arranged along chamber 5 (only a part of the holes in which they are contained has been shown, the others are only indicated schematically) and so the tape will be subjected to practically no jerking nor any appreciable variation in tension.

The normal position of the turned end of the loop inside chamber 5 is substantially at half the length of the chamber and can be varied by varying the position of the slider or resistor 25*c*. The photodiodes 25*e* shown in FIG. 1*a* are connected to a protective circuit for stopping motor 3 (when the loop has reached the closed end of chamber 5) or for stopping winding motor 13 (when the tape is not inside chamber 5).

In FIG. 1 there are also shown, interspaced with holes 22 and 23, holes 26 for blowing air into chamber 5, said holes 26 being connected through manifold pipes 27 to a source of pressure air. With this arrangement the magnetic tape is played upon by a jet of air and does not adhere to the walls of the chamber, thus not lingering to be damaged by them and substantially reducing the winding traction, inasmuch as the friction resistance of the tape within the chamber is reduced.

At the exit of the vacuum chamber 5 there is provided a playback head 28 for rapid slowing down of the tape 4 by slowing down the rotational speed of motor 13, while further along the path of the tape, almost at the end of guide 6, there is located a playback head 29 for precision stopping of the tape, to correctly stop the tape for cutting thereof and splicing the cut ends with the cut ends of the leader contained in the cassette. The slowing down head is provided because of the high drawing speed of the tape, about 10 m/sec., thus substantially higher than the speeds of conventional machines, and also to avoid the brusque stopping of the tape at that speed, which might also not be precise. Head 28 controls a slowing down of the tape 4 to about 1 m/sec. for all the portion that extends for a length corresponding to the distance between head 28 and head 29, and head 29 controls a definitive stop. The circuit for slowing down and stopping the winding motor 13 and therefore the tape 4 is shown in FIGS. 6*a* and 9*b*. Heads 28 and 29 are connected to low-pass filters F respectively, and to triggers T, respectively, which are connected, through a flip-flop circuit 111 or a timer 101, respectively, to power amplifiers A controlling solenoids H and K. At the end of the recorded zone of the tape special signals at very low frequency, outside of the bearing range, are recorded. These signals are sensed by heads 28 and 29, filtered, triggered and amplified and operate solenoids H and K. These solenoids act on commutators *h* and *k*, respectively, which pertain to a circuit (FIG. 6*a*) which provides the general control of the tape winding motor 13 and will be described later.

Between the two heads 28 and 29 there is arranged the tachometer transducer 7 for maintaining constant the drawing speed of the tape and also for measuring the length of the tape. Such a transducer is shown in section in FIG. 6 and consists of a pulley 30 rotating within a cover 31 and provided with a plurality of holes 32 uniformly spaced on its periphery in a position not touched by the tape. A light source 33 sends a luminous signal through said holes 32 onto a sensing element such as photodiode 34 situated opposite to the light source 33 in alignement therewith.

The photodiode 34 is connected to a trigger T and a frequency to voltage converter C, which has an output connected through a resistor 34*a* to a power amplifier P which controls the tape winding motor 13. The motor 13 is mechanically coupled with a tachometer 13*a* which is connected to the input of amplifier P through resistor 13*b*. As further visible in FIG. 6*a* a third resistor 34*b* is connected to the input of amplifier P and to a reference and selection circuit including commutators *j*, *h* and *k* and adjustable resistors 34*c* and 34*d*. During the advancing of the tape the pulley 30 rotates and the sensing element 34 receives a number of luminous pulses from light source 33 through holes 32, this number being proportional to the speed of rotation of the pulley itself. Such pulses, sent to trigger T and to converter C are converted into a voltage proportional to the frequency of the pulses and therefore to the rotation of the pulley 30 and the advancing speed of the tape.

The said voltage signal is compared with the reference signal provided by resistor 34*d* and with the signal furnished by tachometer 13*a*. Resulting signal controls power amplifier P in the sense of slowing down or increasing the speed of motor 13 to maintain the advancing speed of the tape at the constant nominal value, such as 10 m/sec.

When the recorded zone of the tape is terminated and the tape has to be slowed down, the solenoid H is actuated in the manner already described and resistor 34*c* is connected to amplifier P through commutator *h* while resistor 34*d* is disconnected. Reference voltage at the input of amplifier P is now altered so that amplifier P controls motor 13 in the sense of reducing its rotational speed to a lower value in order to have, for instance, an advancing speed of the tape of 1 m/sec.

The stopping of motor 13 occurs by actuation of solenoid K through head 29 in the manner already described. Actuation of solenoid K causes commutator *k* to disconnect resistor 34*c* and to connect the input of differential amplifier P to ground through resistor 34*b*. Motor 13 is caused to stop and the tape will be cut and spliced in chamber 8 as will be described further on.

Solenoid J and commutator *j* are actuated by the control system of the apparatus, as will be seen later, in order to maintain motor 13 stopped while commutators *h* and *k* are returned in the position shown in FIG. 6*a*, so that after splicing motor 13 is started by return of commutator *j* in normal position as shown in FIG. 6*a*.

The pulses sensed by photodiode 34 may also be sent to a counter which serves to measure the length of the tape as it passes. The counter, of known type and therefore not very much described here, can be pre-set in such a manner that, upon reaching the number of meters desired, the winding motor of the tape is automatically caused to stop. It is also possible to use magnetic means instead of optical means 33 and 34 for maintaining constant the pulling speed of the tape. Those means will comprise a magnetic head for sensing the variations of a magnetic flux during rotation of the pulley 30 and for sending corresponding tension pulses to trigger T and converter C.

The reason for which the drawing speed of the tape must be constant is also that of permitting the heads for slowing and stopping 28, 29, which read the signals of given frequency recorded on the tape, to function with precision.

Farther ahead from guide 6 there is located work chamber 8 whose form is visible in FIG. 1 and whose height is about equal to the height of the magnetic tape. The lateral walls of said chamber define a contour which has a length substantially equal to the length of the leader 20 projecting from the cassette. Chamber 8 is normally air-tight closed by a cover (not shown), which allows inspection of the chamber and insertion of tape 4. In this chamber there is a hole 35 through which a high vacuum is produced within the chamber, so as to suck up (as will be described in greater detail further on) the leader of tape 20 from cassette 12, and then blow air into the chamber to blow up the leader itself causing it to adhere to the side walls of the chamber. In the drawing, the leader is shown in an intermediate phase of its expansion. On the side wall 36 of the chamber located at the side of the cutting and splicing zone are foreseen some small suction holes in separate groups, respectively to the right (36*d*) and to the left (36*s*) of cutting element 9. The small holes of each group serve to hold the tape adherent to the substantially straight wall 36 during cutting and splicing and are connected to manifolds 37, 38, in their turn connected to a vacuum source, as schematically shown in FIG. 9a.

Within chamber 8 there is provided opposite the cutting and splicing zone a lower area or recess 39, in which are located movable arms or pivotable members 40*d* and 40*s*. These remain in the lower area during the introduction of the tape into chamber 8, in order not to obstruct said introduction, but can be raised to the height of the tape itself along their shafts 41 and then rotated in opposite direction toward wall 36, so as to adhere to the tape itself. The height of members 40*d* and 40*s* is equal to that of the tape. Members 40*d* and 40*s* have a substantially flat face provided with little suction holes 42 on the side facing wall 36, said holes 42 being designed to hold through suction the cut ends of the tape, as will be seen better in the following. The axial movement of members 40*d* and 40*s* occurs through a bifurcated lever 43 (FIG. 2), pivoted at one end to plate 1 and engaging at the other ends rings 45 secured to shafts 41. Lever 43 is controlled by pneumatic cylinder 44 operated by the control system of the apparatus (FIG. 9*a*). The pivotal movement of members 40*d* and 40*s* is controlled by two separate pneumatic cylinders 46 and 47 (FIG. 3) driving oscillating arms 48 and 49 connected to shafts 41 in a way to be axially slidable thereon but rotatably rigid therewith. The control for pivotal movement of members 40*d* and 40*s* is separate, in that the operations that these members must perform as well as the time cycles in which they must be operative are in part different from one another, as will be seen in the description of the operation of the apparatus.

Into chamber 8 there enters with a certain slant, so as not to interfere with leader 20, a slidable punch 10 (FIG. 2), whose purpose is to splice the tape 4 to the leader 20. The punch is guided in a guide 50 provided in plate 1 through means of a pneumatic cylinder 51 having a piston rod connected to punch 10 by means of an arm 52. A hydraulic dampener 53 is arranged opposite to cylinder 51 and has a piston rod also connected to arm 52.

An adhesive or splicing tape 54 supplied by supply reel 18 already mentioned and wound on take-up reel 56 crosses the path of punch 10 where the latter enters a fixed part or matrix 55 having an opening corresponding practically to the strip of adhesive tape which will effect the splicing of the magnetic tape 4 with the respective end of the leader 20. The adhesive tape has a width a little greater than the magnetic tape, so that after the perforation caused by punch 10 entering matrix 55 it can be stepwise rewound, being no longer usable, on take-up reel 56, as will be seen farther on. Reels 18 and 56 are supported by plate 1.

Figures 4, 5, 6, 7:
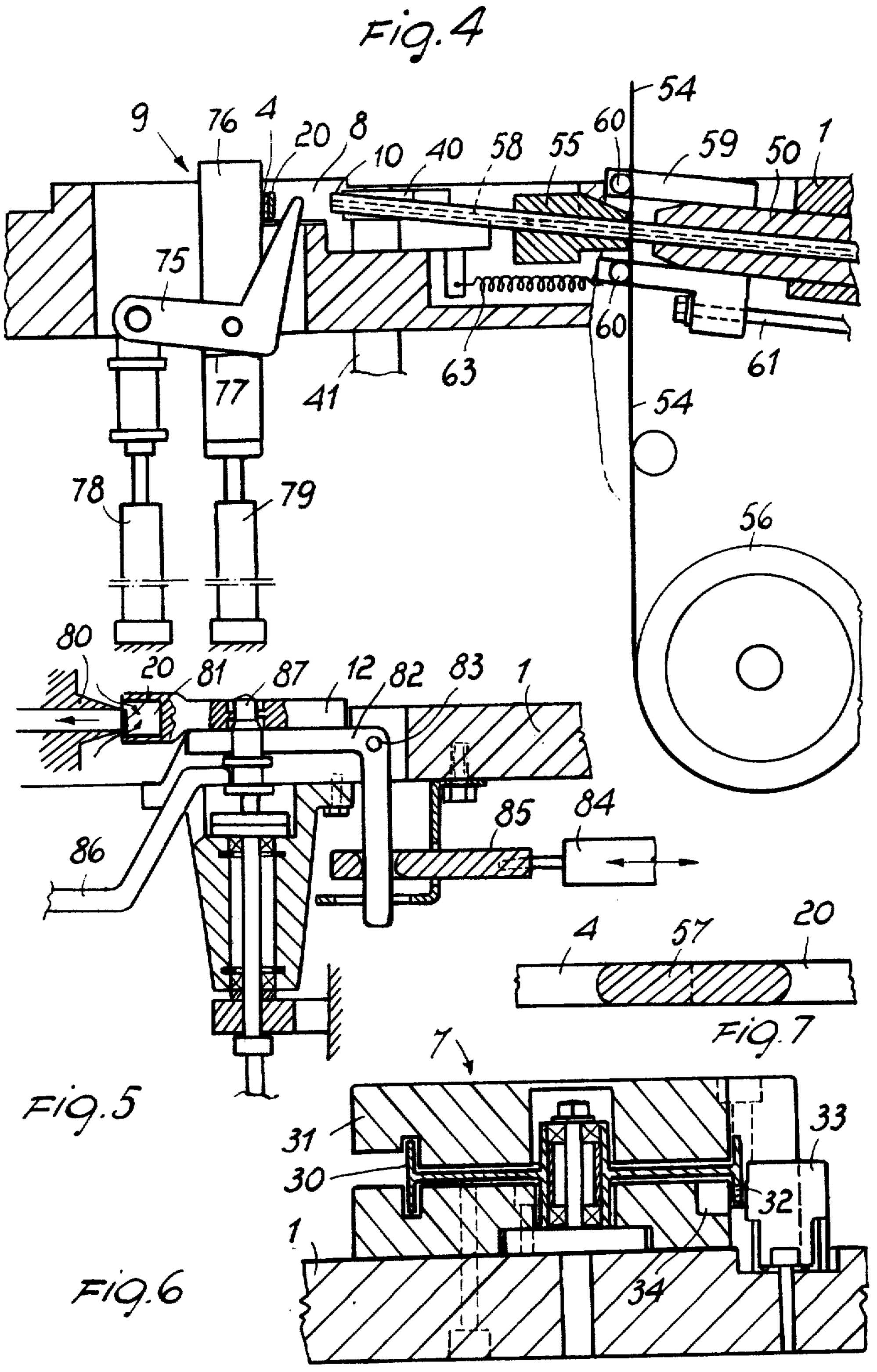
FIG. 4 shows a detail of FIG. 2.
FIG. 5 is a cross section view taken along lines V—V in FIG. 1 showing the means for extracting the tape leader from the cassette and for removing the cassette at the end of the operation.
FIG. 6 shows the speed-control means for the winding of the magnetic tape.
FIG. 7 shows the tape and the leader after splicing.

The cross-section of punch 10 and also of matrix 55 are such as to produce an opening 57 in the adhesive tape having rectangular shape and rounded corners, as shown in FIG. 7. In this manner the splicing between the tapes is less subject to possible detachment caused often by the fact that the adhesive does not hold sufficiently in the zone of sharp corners or by the fact that shocks or accidental contacts cause a separation from one of the corners which then leads to the total separation of the adhesive strip from the spliced area.

The front surface of the punch is slightly inclined with respect to a plane orthogonal to the axis of the punch, so as to be practically parallel to the surface of tape 4 in chamber 8. A suction duct 58 is defined in the punch for the purpose of holding the cut strip of adhesive tape during the movement toward the splicing area. Piston strokes not shown control the beginning of the suction at the instant of cutting the adhesive tape 54 and the cessation of same after splicing.

At 59 (FIG. 4) there is indicated a slide member partially slidable on guide 50 and provided with two small pins 60 located diametrically opposite the axis of punch 10 and engaging the adhesive tape during the last part of the return stroke of the punch, so as to separate said adhesive tape from matrix 55 and permit the adhesive tape to advance for next punching operation. Slide member 59 is controlled by rod 61 which is engaged by a projecting part 62 of punch 10, as shown schematically in FIG. 2. A spring 63 causes the slide member 59 to return into rest position as soon as the punch begins again its operative advancing stroke. The slide member remains in this rest position during the entire duration of said advancing stroke as well as during almost all of the return stroke.

For the stepwise advance of the adhesive tape 54 there is provided a free-wheel mechanism 65 operated during the last portion of the return stroke of punch 10 by a control member 65. The latter causes the rotation of a certain angle of lever 66, rigid with wheel 64, and therefore a corresponding rotation of gears 67 and of pulley 68, which latter operates, by means of a belt 69 or the like, a pulley 70 rigid with the take-up reel 56 of the adhesive tape 54. A spring 71 causes lever 66 to return in rest position with wheel 64 without rotation of the gears 67 and pulleys 68 and 70. An adjustable stop 72 prevents counter-clockwise rotation of wheel 64, while a friction clutch 73 prevents lever 66, controlled by member 65, from making an oscillation greater than that corresponding to the advancement of one step of adhesive tape 54.

The magnetic tape 4 and the leader 20 of the tape already contained within the cassette must be cut before being spliced. For this purpose there is provided a cutting device 9, located near a projecting part 74 of support plate 1. Said device comprises (FIG. 4) a pivotable cutting member 75 shaped substantially as a square, and a stationary counter-element 76 substantially in the shape of a parallelepiped to which said cutting member 75 is pivoted and which cooperates with said cutting member during the cutting. The counter-element 76 has a projecting shoulder 77, which limits the angular movement of cutting member 75. The latter is controlled by a pneumatic cylinder 78 actuated by the general control of the apparatus, while the counter-element or stop means 76 is connected to a hydraulic dampener 79. The counter-element 76 acts also as a backstop for punch 10 during the tape-splicing phase.

Figures 2, 3:
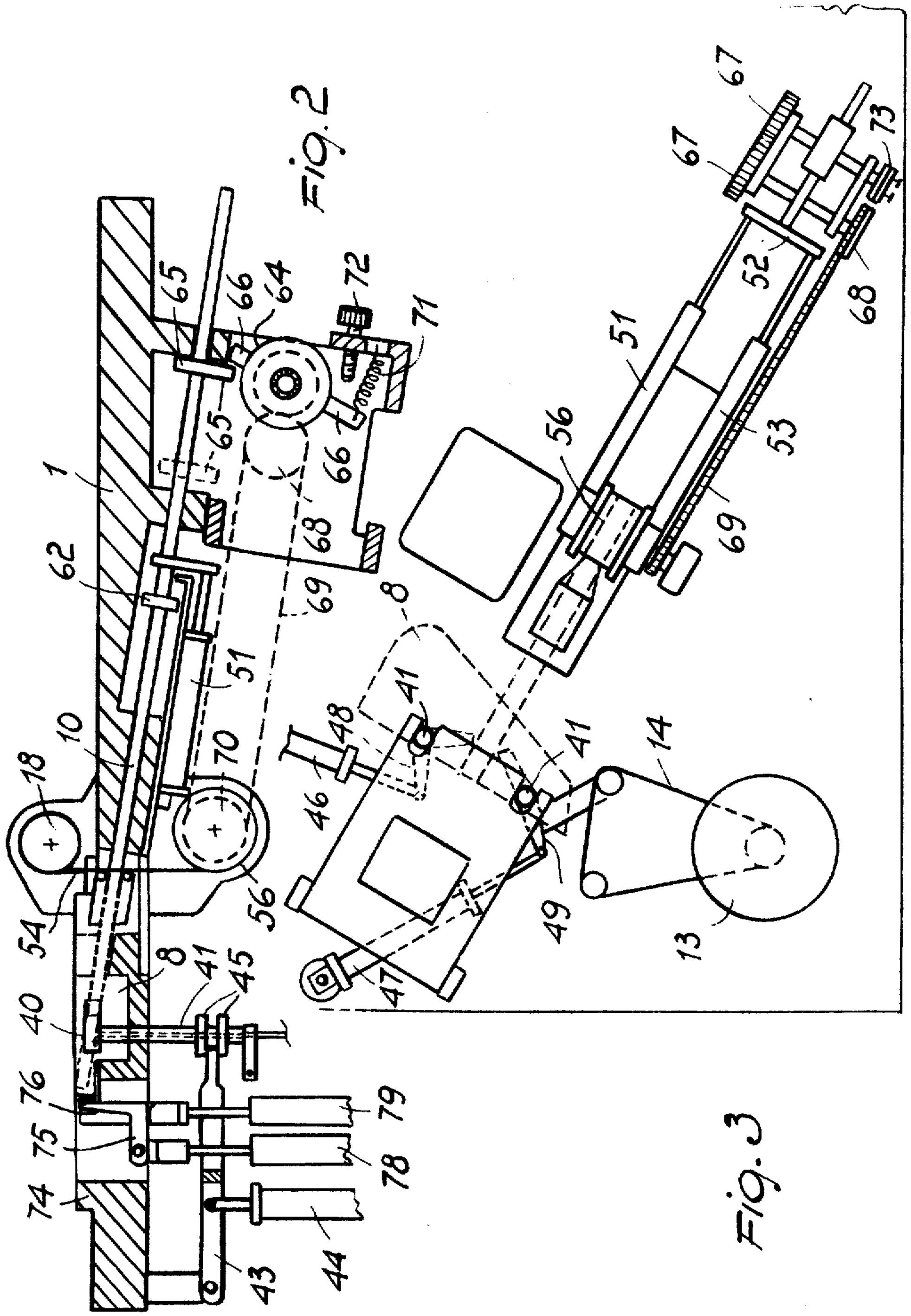
FIG. 2 is a cross section view taken along lines II—II in FIG. 1.
FIG. 3 is a view from below (or behind) of the apparatus according to this invention.

The two positions of members 75 and 76 just described are shown respectively in FIG. 4 (position before cutting) and FIG. 2 (position after cutting when the punch operates the splicing). During the cutting phase, cylinder 78 is activated and the piston thereof raises and causes the cutting member 75 to be rotated in clockwise direction until it engages projecting shoulder 77. From this moment the raising movement of member 75 is transferred also to counter-element 76, and both members 75 and 76 are raised to a position such that the tape becomes grasped and inserted between these members. Inverting the stroke of the piston of cylinder 78, there is firstly the rotation of cutting member 75 in counterclockwise direction, during which there occurs the cutting of the tape (or tapes) and then, when element 75 contacts the projecting shoulder 77, there is also the lowering of counter-element 76 to the starting or rest position. In this position the upper part of the counter-element 76 acts as a backstop for punch 10, whereas during the splicing phase it provides a support base for the tape.

FIG. 5 shows in detail the means for removing the finished cassette and also clarifies how the suction of the leader 20 into chamber 8 occurs. For this purpose the opening 80 of the chamber 8 is provided in a projection of the chamber wall, said projection having a cross section in the form of a trapezium, whose smaller base corresponds substantially to the height of the tape. Since the opening 81 of cassette 12, from which the tape is extracted, is higher, atmospheric pressure acts on the side of the tape opposite to that facing the opening 80 of chamber 8, so that once a violent suction if effected through hole 35 leader 20 is surely sucked into chamber 8.

The means for removing the completed cassette comprise an angular arm 82 hinged at 83 to support plate 1 and actuated by a pneumatic cylinder 84 by means of a rod 85, provided with a hole in which is inserted one end of arm 82. Arm 82 is arranged below the cassette 12 so that the instantaneous movement of rod 85 toward the left in the drawing overturns the cassette 12. The latter falls into a collector not shown while the next cassette is then lowered into the place of the preceding by adequate means not forming part of the invention.

In FIG. 5 there is also shown another arm 86 whose purpose is to lower the ribbed tape-winding pin 87, so that the cassette may always be correctly positioned, regardless of the reciprocal position between the ribs of the pin and those of the internal winding hub 15 of the cassette. Once the cassette 12 has been positioned the arm 86 is set free and the notched pin 87 raises through spring action into hub 15. A clutch adjusted to slip when a pull equal to or greater than 50 grams is exerted between the winding hub rotated by belt 14 and pin 87 is also provided, so as to avoid jerks or brusque variations in speed during the winding of the end of the leader 20 which has been spliced to the end of the magnetic tape.

The operation of the apparatus will now be described by reference also to FIG. *9a* and *9b*.

The control system of the apparatus includes a scanner 88 of known type provided for subsequently giving control pulse at one of the outputs 1 . . . 10 in a succession from 1 to 10. The pulse at one output is given only after the pulse at the preceding output has ceased. For this purpose a OR-gate 89 is arranged at the input of scanner 88 in a manner such that at any pulse generated at the output of OR-gate 89 and caused by the cessation of an input pulse at the input of gate 89, as will be seen hereinafter, the output pulse of scanner 88 is transferred to the next output. An output signal is provided at one output only and no signal is provided at the remaining outputs.

The control system shown in FIGS. *9a* and *9b* further comprises a start switch 90, timers 91 to 104, flip-flop circuits 105 to 114 and electrovalves 115 to 127, which are all of known type and need not to be described in detail.

Provided that the tape 4 has been inserted into chamber 8 by opening said chamber from the top (this operation is no longer necessary for loading the following cassettes) and that a cassette 12 has been positioned on plate 1, start switch 90 is operated and a control pulse is generated at output 1 of scanner 88 controlled by "OR"-gate 89. Through timer 91 and an amplifier A electrovalve 115 is operated and chamber 8 is connected through hole 35 and electrovalve 115 to a source of vacuum, whereby a brusque suction is caused in chamber 8 and the leader 20 is extracted from cassette 12. A moment later the output pulse of timer 91 ceases, electrovalve 115 is disactivated and timer 92 is operated, which controls, through power amplifier A, electrovalve 116, by means of which air is blown into chamber 8 through hole 35, causing the leader to adhere to the walls of the chamber and to tape 4 which adheres to wall 36 (FIG. 8). Subsequently, output pulse of timer 92 ceases, electrovalve 116 is disactivated and the cessation of output pulse of timer 92 controls OR-gate 89, which controls scanner 88 to emit a pulse at output 2 while the pulse at output 1 ceases.

Output pulse at output 2 of scanner 88 controls flip-flop 105, which operates electrovalve 117 to supply pressure air from a pressure air source (not shown) to double-acting cylinder 44. The piston of the latter is caused to raise, thus raising shafts 41 and pivotable members 40*d* and 40*s* which are raised above recess 39 of chamber 8. The pulse at output 2 of scanner 88 further controls flip-flop 106 and 107, which actuate electrovalves 118 and 119, respectively, causing pressure air to operate pistons of cylinders 46 and 47, respectively, for partially rotating pivotable members 40*s* and 40*d* to urge them against the tapes adhering on wall 36. The said pulse at output 2 also controls flip-flop 108 and 109, which actuate electrovalves 122 and 123 for connecting holes 36*s* and 36*d* to a source of vacuum, thereby making the tape 4 to well adhere to wall 36, and flip-flop 112 and 113, which actuate electrovalves 120 and 121 for connecting the holes 42 of pivotable members 40*s* and 40*d* to a source of vacuum, whereby leader 20 is held adherent to members 40*s* and 40*d*.

The tape 4 and the leader 20 held between members 40*d* and 40*s* and wall 36 are now positioned for cutting. By means of timer 94 OR-gate 89 is controlled to send a pulse to scanner 88, thus providing on output pulse at output 3. The pulse at output 2 ceases but the flip-flop circuits previously operated remain in "set" position and pivotable members 40*s* and 40*d* continue to hold the leader and the tape pressed against wall 36 and suction through holes 36*s*, 36*d* and 42 continues. The pulse at output 3 controls timer 95 to emit a pulse for actuating electrovalve 124, which controls the piston of cylinder 78 to operate the raising of members 75 and 76. When the output pulse of timer 95 terminates, electrovalve 124 returns in the position shown in FIG. 9b and the piston of cylinder 78 lowers, thus causing the cutting of the tape 4 and the leader 20 in the manner already described, and a control pulse operates OR-gate 89 to control scanner 88, which now emits a pulse at output 4.

This pulse resets flip-flop 106, whereby electrovalve 118 returns in the position shown in FIG. *9a* and pivotable member 40s is rotated away from wall 36 together with the cut end of leader 20 sucked by means of holes 42 of member 40*s*. The other cut end of leader 20, held between member 40*d* and wall 36, and the cut end of tape 4 held by holes 36*s* are now in position for splicing. By means of timer 93 a pulse is sent to OR-gate 89, which controls scanner 88 to emit a control pulse at output 5. This control pulse resets flip-flop 109, thus stopping suction from holes 36*d* since electrovalve 123 returns in the position shown in FIG. *9a*, and also controls timer 98, which actuates electrovalve 125. The latter connects the lower end of cylinder 51 to a source of pressure air, thus operating punch 10 which enters matrix 55, cuts a portion of adhesive tape 54 and applies this portion on the ends of tape 4 and leader 20 within chamber 8. The pulse at output 5 also resets flip-flop 112 and suction from holes 42 of member 40*d* ceases. When the output pulse of timer 98 ceases punch 10 returns in the starting position since electrovalve 125 returns in the starting position shown in FIG. *9b*, flip-flop 108 is reset and suction through holes 36*s* is stopped, and flip-flop 110 is controlled, which actuates solenoid 5 (FIG. 6a). Motor 13 is now started and hub 15 winds firstly the end portion of leader 20 and subsequently the tape which is apliced thereto.

The winding of the tape continues at constant speed, as already described, until the signals provided at the end of the recorded zone of the tape are sensed by head 28, which controls, in the manner already described, flip-flop 111 and solenoid H, which latter controls the slowing down of motor 13, as already described. Subsequently head 29 controls the stopping of motor 13 by actuating timer 101 and solenoid K, as already described.

The end of the output pulse of timer 101 resets flip-flop 110, thus actuating solenoid J which makes commutator j to return in the rest position shown in FIG. 6a, and operates OR-gate 89 to send a control signal to scanner 88, which now emits a control pulse at output 6. This control pulse sets flip-flop 108, thus newly providing suction through holes 36s since electrovalve 122 is newly actuated, flip-flop 106 in order that pivotable member 40s returns to adhere to wall 36, and controls timer 102. The latter newly sets flip-flop 112, thus newly providing suction through holes 42 of member 40d, which adheres to wall 36, and actuates timers 96 and 97, which control, through electrovalves 124 and 125, a further operation of the pistons of cylinders 78 and 51, respectively. A cut of tape 4 and a subsequent splicing takes place substantially as described above, so that the trailing end of the tape is spliced to the end of the leader of the cassette previously held by member 40s. Though timers 96 and 97 are actuated simultaneously cutting occurs before splicing because of the shorter intervention time of timer 96 and the smaller stroke of the piston of cylinder 78 with respect to the stroke of punch 10. Once the pulse at the output of timer 97 ceases, OR-gate 89 is controlled to send a control signal to scanner 88, which now emits a control pulse at output 7.

The said pulse at output 7 of scanner 88 resets flip-flop 112 and flip-flop 113, which control electrovalves 120 and 121 in a manner such that suction through holes 42 of member 40d and 40s ceases. The pulse at output 7 of scanner 88 further resets flip-flop 105, flip-flop 106 and flip-flop 107 through timer 99, so that electrovalves 117, 118 and 119 return to the position shown in FIG. 9a and control cylinders 44, 46 and 47 in order that pivotable members 40d and 40s are pivoted away from wall and returned into recess 39.

The said pulse at output 7 further controls timer 99a, so that subsequently solenoid J and commutator j are controlled in order to newly start motor 13, preferably at a slow speed of 1 m/sec, to wind the last portion of tape 4 and the end of leader 20 into cassette 12 and thereby complete the loading of the cassette. The output of timer 99a controls OR-gate 89, which sends a signal to scanner 88, whereby a control pulse appears at output 8. This control pulse serves for operating, through electrovalve 126, cylinder 84 and therefore piston rod 85 by means of which the cassette is removed from its loading position. When the output of timer 103 terminates, electrovalve 126 and piston rod 85 return into their rest position and OR-gate 89 is controlled. Scanner 88 now emits a control pulse at output 9, which sets flip-flop 114, thus controlling electrovalve 127 to supply pressure air into cylinder 128. The piston thereof causes roller 17 to be displaced into engagement with the tape to remove that end 19 thereof which after the first introduction of the tape into chamber 8 before operating start switch 90 remained out of chamber 8 (FIG. 1). The last operation is no longer necessary for the following cassettes. Removal of the tape end 19 occurs by actuation of timer 100 which controls flip-flop 110, the latter controlling solenoid J and commutator j. Motor 13 is started and pressure roller 17, which is urged against rotatable roller 17a, causes the end 19 of the tape to be withdrawn from chamber 8 and definitively removed. Timer 104 now controls OR-gate 89 to send a control pulse to scanner 88, which now emits a control pulse at output 10. The said pulse serves for resetting all the flip-flop circuits of the control device, so that all the means controlled by said flip-flop circuits return in the starting position and operation can begin with another cassette. Resetting occurs through line 129.

In the case that the tape supplied by spool 2 is previously recorded and there are non recorded tape portions between the recorded zones, which are loaded into the cassettes, additional steps will be provided for removing the non recorded tape portions. Before actuating roller 17 it will be necessary to splice the said end 19 to the forward end of the non recorded tape portion, so that the removal of end 19 will cause the removal also of the non recorded portion spliced thereto. Subsequently, a cutting will be carried out at the end of the non recorded zone and the starting conditions for the loading of another cassette will newly be established. The said additional operations will be carried out by control means analogous to those previously described and it will be quite understandable to a person skilled in the art how to arrange these additional controls into the circuit of FIGS. 9a and 9b.

Instead of a control operated by a scanner 88 it is also possible to use a control consisting of cams arranged on a common rotatable shaft and actuating the various electrovalves which control all the steps of the operation of the apparatus. It is clear that the control systems illustrated in FIGS. 1a, 6a and 9a and 9b are given as examples only and that many other control systems may be provided for the apparatus according to the invention as claimed in the following claims.

What is claimed is:

1. An apparatus for cutting, splicing and winding a magnetic tape into a cassette, comprising a support for positioning the cassette, means for extracting the leader of the tape already contained within the cassette through an opening of the cassette, positioning means for said leader and said magnetic tape including pivotable members having suction holes for holding said leader and said magnetic tape, means for cutting said leader and said magnetic tape held by said positioning means, means for splicing a free end of said leader respectively to a free end of said magnetic tape, after cutting, means for advancing and winding the magnetic tape into said cassette after splicing, means for controlling the winding speed and tension of said magnetic tape and means for removing said cassette from said positioning support, wherein, according to the improvement, said means for extracting the leader of the tape already contained within the cassette comprise a chamber having a height substantially equal to the height of said magnetic tape and of said leader and lateral walls defining a contour of length substantially equal to the length of said leader, an opening in said chamber opposite and proximate to said opening of the cassette positioned on said support, the height of said opening being substantially equal to the height of said tape leader, at least one hole in said chamber, and means for creating a vacuum within said chamber through said hole for the extraction of said leader from said cassette, and wherein said positioning means comprise pivotable members arranged within said chamber proximate to a portion of said lateral walls of said chamber and means for moving said pivotable members between a rest position spaced from said portion and an operative position contacting therewith, and suction holes arranged in said portion and means for creating a suction through said suction holes for holding said leader and said magnetic tape during cutting and splicing thereof when said pivotable members are in said operative position.

2. An apparatus as claimed in claim 1, wherein said chamber has a bottom provided with a recess for receiving said pivotable members in said rest position in which said pivotable members are withdrawn from the path of the said leader sucked within said chamber.

3. An apparatus as claimed in claim 1, wherein said chamber has a bottom provided with a recess for receiving said pivotable members in said rest position and wherein said means for moving said pivotable members comprise a control shaft for each of said pivotable members, the shafts being arranged axially displaceable within said recess and rotatable about their axis for bringing said pivotable members independently from each other from said rest position to said operative position in which said pivotable members are held against said portion of said lateral walls of said chamber.

4. An apparatus as claimed in claim 1, wherein said portion of said lateral walls of said chamber has two independent groups of suction holes, each group being associated with one of said pivotable members.

5. An apparatus as claimed in claim 1, wherein said means for splicing comprises a punch movable inside said chamber in a substantially inclined position compared to the plane defined by the bottom of said chamber, said punch having a front surface lying in a plane substantially parallel to the plane of said tape and said leader within said chamber and further having at least one suction channel leading into said front surface, a matrix defining a passage for said punch and having an opening essentially equal in cross-section to the cross section of said punch, and means supplying a strip of adhesive tape to be sheared by said punch penetrating into said matrix for effecting the splicing of said leader with said tape and stop means defined by a section of said portion of said lateral walls of said chamber, said counter means holding the tape and stopping the punch during splicing.

6. An apparatus as claimed in claim 5, wherein the cross section of said punch and said opening of said matrix have a substantially rectangular shape with rounded corners.

7. An apparatus as claimed in claim 5, wherein said adhesive tape has a width greater than that of said magnetic tape and than the height of said opening of said matrix, and wherein said means supplying said adhesive tape include a supply reel from which said adhesive tape is unreeled and a take-up reel on which said adhesive tape is reeled after having been sheared by said punch and apertures corresponding to the cross section of said punch have been made in said adhesive tape.

8. An apparatus as claimed in claim 5, further comprising a slide member arranged in proximity to said matrix and slidable substantially parallel to said punch, means on said slide member for engaging and removing the adhesive tape from said matrix at the end of the splicing operation, and spring-like return means provided for causing said slide member to return to a non-operative position during the shearing and splicing operation of the adhesive tape.

9. An apparatus as claimed in claim 1, wherein said opening of said chamber is provided on a portion of said chamber projecting to the outside and has a height substantially equal to the transverse dimension of the tape and less than the height of said opening of said cassette.

* * * * *